(12) United States Patent
Bouguet et al.

(10) Patent No.: US 7,739,662 B2
(45) Date of Patent: Jun. 15, 2010

(54) METHODS AND APPARATUS TO ANALYZE PROCESSOR SYSTEMS

(75) Inventors: Jean-Yves Bouguet, Belmont, CA (US); Marzia Polito, Burbank, CA (US); Carole Dulong, Saratoga, CA (US); Erez Perelman, La Jolla, CA (US)

(73) Assignee: Intel Corporation, Santa Clara, CA (US)

( * ) Notice: Subject to any disclaimer, the term of this patent is extended or adjusted under 35 U.S.C. 154(b) by 1142 days.

(21) Appl. No.: 11/323,532

(22) Filed: Dec. 30, 2005

(65) Prior Publication Data

US 2007/0157177 A1 Jul. 5, 2007

(51) Int. Cl.
*G06F 9/44* (2006.01)
*G06F 9/45* (2006.01)
*G06F 11/00* (2006.01)

(52) U.S. Cl. ........................ 717/124; 717/126; 717/127; 717/128; 717/131; 717/151; 717/158; 714/38

(58) Field of Classification Search ................. 717/124, 717/126–128, 131, 151, 158; 714/38
See application file for complete search history.

(56) References Cited

U.S. PATENT DOCUMENTS

| | | | |
|---|---|---|---|
| 5,606,685 A | 2/1997 | Frandeen | |
| 5,850,632 A | 12/1998 | Robertson | |
| 6,055,650 A | 4/2000 | Christie | |
| 6,237,065 B1 | 5/2001 | Banerjia et al. | |
| 6,314,530 B1 * | 11/2001 | Mann | 714/38 |
| 6,415,359 B1 | 7/2002 | Kimura et al. | |
| 6,571,318 B1 | 5/2003 | Sander et al. | |
| 6,622,168 B1 | 9/2003 | Datta | |
| 6,751,707 B2 | 6/2004 | Magoshi | |
| 6,752,335 B2 | 6/2004 | Levia | |
| 2001/0042172 A1 | 11/2001 | Duesterwald et al. | |
| 2001/0052064 A1 | 12/2001 | Chaudhry et al. | |
| 2002/0152361 A1 | 10/2002 | Dean et al. | |
| 2003/0105942 A1 | 6/2003 | Damron et al. | |
| 2003/0140203 A1 | 7/2003 | Jordan et al. | |

(Continued)

OTHER PUBLICATIONS

Wu, et al. "From Trace Generation to Visualization: A Performance Framework for Distributed Parallel Systems", 2000, IEEE, p. 1-18.*

(Continued)

*Primary Examiner*—Wei Y Zhen
*Assistant Examiner*—Qamrun Nahar
(74) *Attorney, Agent, or Firm*—Hanley, Flight & Zimmerman, LLC

(57) ABSTRACT

Methods and apparatus are disclosed to analyze processor system. An example method to analyze execution of a multi-threaded program on a processor system includes generating a first program trace associated with the execution of a first thread, generating a first list of execution frequencies associated with the first program trace, generating a second program trace associated with the execution of a second thread, generating a second list of execution frequencies associated with the second trace, generating a first set of one or more vectors for the first list of execution frequencies, generating a second set of one or more vectors for the second list of execution frequencies, and analyzing the one or more vectors to identify one or more program phases.

30 Claims, 8 Drawing Sheets

U.S. PATENT DOCUMENTS

| | | | |
|---|---|---|---|
| 2004/0103408 A1 | 5/2004 | Chilimbi et al. | |
| 2004/0111708 A1* | 6/2004 | Calder et al. | 717/131 |
| 2004/0128658 A1* | 7/2004 | Lueh et al. | 717/151 |
| 2004/0154011 A1* | 8/2004 | Wang et al. | 717/158 |
| 2004/0215668 A1 | 10/2004 | Sun | |
| 2004/0216097 A1 | 10/2004 | Sun | |

OTHER PUBLICATIONS

Kaplan, S. "Collecting Whole-System Reference Traces of Multiprogrammed and Multithreaded Workloads", 2004, ACM, p. 228-237.*

U.S. Appl. No. 10/424,356, filed Apr. 28, 2003, Sun.

U.S. Appl. No. 10/833,762, filed Apr. 28, 2004, Sun.

Hazelwood et al., *Code Cache Management Schemes for Dynamic Optimizers*, Proceedings of the Sixth Annual Workshop on Interaction between Compilers and Computer Architectures (INTERACT'02), 2002, 9 pages.

Doug Joseph et al., "*Prefetching using Markov Predictors*", 1997 Proceedings of the International Symposium on Computer Architecture (ISCA'97), Jun. 1997, Denver Colorado, p. 1-13.

Trishul M. Chilimbi et al., "*Dynamic Hot Data Stream Prefetching for General-Purpose Programs*", PLDI-2002, May 2002, p. 1-12.

Mingqiu Sun et al., "*Entropy-based Characterization of Program Phase Behaviors*", Feb. 2004, Madrid Spain, CTG-MTL, Intel Labs, p. 1-8.

S. Dhodapkar et al., "*Comparing Program Phase Detection Techniques*", Micro-2003, 2003, p. 1-12.

V. Bala et al., "*Dynamo: A transparent dynamic optimization system*", PLDI'2000, Jun. 2000, p. 1-13.

B. Balasubramonian et al., "*Memory Hierarchy Reconfiguration for Energy and Performance in General Purpose Architectures*", Micro-2000, Dec. 2000, p. 1-14.

J. E. Smith et al., "*Dynamic Microarchitecture Adaptation via Co-designed Virtual Machines*", ISSCC-2002, Feb. 2002, p. 1-4.

M. Huang et al., "*Positional Adaptation of Processors: Application to Energy Reduction*", ISCA-2003, Jun. 2003, p. 1-13.

T. Sherwood et al., "*Phase Tracking and Prediction*", ISCA-2003, Jun. 2003, p. 1-13.

T. Sherwood et al., "*Automatically Characterizing Large Scale Program Behavior*", ASPLOS-2002, Oct. 2002, p. 1-14.

C.E. Shannon, "*A Mathematical Theory of Communication*", Bell Syst. Tech. J., 27, 379-423, 623-656. Jul. and Oct. 1948.

*Standard Performance Evaluation Corperation* (SPEC) JBB2000 [online]. SPEC [retrieved on Apr. 17, 2006: Retrieved from the Internet: <URL: http://web.archive.org/web/20041011042918/www.spec.org/jbb2000>, 2 pages.

*Standard Performance Evaluation Corperation* (SPEC) JBB2000 [online]. SPECjAppServer [retrieved on Apr. 17, 2006]: Retrieved from the Internet: <URL: http://www.web.archive.org/web/20040413033403/www.spec.org/jAppSer>, 2 pages.

*Dinero IV Trace-Driven Uniprocessor Cache Simulator*: [retrieved on Apr. 17, 2006]: Retrieved from the Internet: <URL: http://www.web.archive.org/web/20040603081702/www.cs.wisc.edu>, 2 pages, Edler, et al.

Annavaram et al., *The Fuzzy Correlation between Code and Performance Predictability*, Proceeding of the $37^{th}$ International Symposium on Microarchitecture, 2004, 12 pages.

Peggy Irelan, *Evaluating Instrucions Retired Events on Intel® Processors with Hyper-Threading Technology*, [retrieved on Dec. 9, 2005]: Retrieved from the Internet: URL: http://www.intel.com.cd/ids/developer/asmo-na/eng/20468.htm, 11 pages.

Sherwood et al., *Basic Block Distribution Analysis to Find Periodic Behavior and Simulation Points in Applications*, Department of Computer Science and Engineering, University of California, San Diego, in proceedings of the International Conference on Parallel Architecture and Compilation Techniques (PACT), Sep. 2001, 12 pages.

Patil et al., *Pinpointing Representative Portions of Large Intel® Itanium® Architecture Programs with Dynamic Instrumentation*, Proceedings of the $37^{th}$ Annual IEEE/ACM International Symposium on Microarchitecture, 2004, 12 pages.

Ashutosh S. Dhodapkar et al., "Managing Multi-Configuration Hardware via Dynamic Working Set Analysis", May 2002, 12 pages., retrieved from http://www.cae.wisc.edu/~dhodapka/isca02.pdf.

Davies et al., iPart: An Automated Phase Analysis and Recognition Tool, Microprocessor Research Labs-Intel Corporation-SC12-303, Santa Clara, California, 12 pages, 2004.

Ekman et al., Enhancing Multiprocessor Architecture Simulation Speed Using Matched-Pair Comparison, Department of Computer Science and Engineering Chalmers University of Technology, Goteborg, Sweden, 11 pages, Mar. 20-22, 2005.

Sherwood et al., Phase Tracking and Prediction, Department of Computer Science and Engineering University of California, San Diego, 12 pages, In Proceedings of the 30th International Symposium on Computer Architecture (ISCA), Jun. 2003.

* cited by examiner

| Instructions Retired (x10$^5$) | Thread 1 (EIP) | Thread 2 (EIP) | Thread 3 (EIP) |
|---|---|---|---|
| 1 | 1 | 2 | 2 |
| 2 | 1 | 1 | 3 |
| 3 | 2 | 3 | 3 |
| 4 | 1 | 1 | 3 |
| 5 | 1 | 2 | 2 |
| 6 | 3 | 1 | 3 |
| 7 | 3 | 3 | 2 |
| 8 | 2 | 3 | 1 |
| 9 | 1 | 1 | 1 |
| 10 | 3 | 2 | 2 |
| 11 | 3 | 1 | 1 |
| 12 | 1 | 1 | 1 |

| Identifier (thread,order) | EIP 1 | EIP 2 | EIP 3 |
|---|---|---|---|
| 1,1 | 2 | 1 | 0 |
| 1,2 | 2 | 0 | 1 |
| 1,3 | 1 | 1 | 1 |
| 1,4 | 1 | 0 | 2 |
| 2,1 | 1 | 1 | 1 |
| 2,2 | 2 | 1 | 0 |
| 2,3 | 1 | 0 | 2 |
| 2,4 | 2 | 1 | 0 |
| 3,1 | 0 | 1 | 2 |
| 3,2 | 0 | 1 | 2 |
| 3,3 | 2 | 1 | 0 |
| 3,4 | 2 | 1 | 0 |

Frequency

FIG. 6

METHODS AND APPARATUS TO ANALYZE PROCESSOR SYSTEMS

FIELD OF THE DISCLOSURE

The present disclosure relates generally to processor systems and, more particularly, to methods and apparatus to analyze processor systems.

BACKGROUND

Computer processor designers rely heavily on benchmark simulations to evaluate various design alternatives. To this end, significant emphasis is placed on accurately modeling the design choices in software simulators. Despite the fact that processing power has increased, accurate modeling of a complex design may dramatically reduce simulation speed, thereby restricting the ability to study tradeoffs between design alternatives. To address this issue, researchers sometimes simulate only a small fraction of the overall program execution, in the hope that the simulated fraction is a good representation of the overall program behavior. However, recent studies have shown that programs exhibit different behaviors during different execution phases that occur over a long time period. Consequently, there is tension between the need to reduce the time required for accurate simulations and the need to simulate program execution over a long period of time to accurately capture the phase behavior.

The behavior of a program is not random. As programs execute, they exhibit cyclic behavior patterns. Recent research has shown that it is possible to accurately identify and predict phases in program execution. An understanding of the phase behavior of a program can be exploited for accurate architecture simulation, to compress program traces, to conserve power by dynamically reconfiguring caches and processor width to guide compiler optimizations, and/or to provide feedback to the programmer to guide program optimization.

Prior work on phase classification divides a program's execution into intervals. An interval is a contiguous portion of execution (e.g., a slice in time) of a program. Intervals that exhibit similar behavior (e.g., a similar number of instructions per cycle (IPC), similar cache miss rates, similar branch miss rates, etc) are classified as members of a phase. The intervals that belong to a given phase need not be located together (e.g., adjacent in time). Instead, intervals that belong to a given phase may appear throughout the program's execution. Some prior work uses an off-line clustering algorithm to break a program's execution into phases to perform fast and accurate architecture simulation by simulating a single representative portion of each phase of execution. One example method for performing this type of analysis is the Automated Phase Analysis and Recognition Tool (iPART) from Intel (B. Davies et al., *Ipart: An Automated Phase Analysis and Recognition Tool*, tech. report, Microprocessor Research Labs, Intel Corp., November 2003).

A software program can contain multiple threads that can execute different instructions from a software program simultaneously or almost simultaneously. For example, multiple threads may allow multiple users to execute a software program simultaneously on a single computer. Multi-threaded software programs may be quite complex and may be more difficult to analyze than single threaded software programs. For example, if multiple threads attempt to access a hardware resource simultaneously, one thread may be delayed until the other thread finishes accessing the resource. Further, simultaneous execution of multiple threads can change program phases or result in new phases that would not occur if only one thread were executing. Moreover, if threads are spawned at different times from execution to execution, the phases defined based on system resources may be different from execution to execution. The complexities of analyzing multi-threaded software programs executing on one or more computer processors has created a desire for a tool to analyze such multi-threaded software programs.

BRIEF DESCRIPTION OF THE DRAWINGS

FIG. 4 is an example table illustrating an example output from the example data extractor of FIG. 1.

FIG. 5 is an example set of vectors generated from the example output illustrated in FIG. 4.

FIG. 6 is an example table illustrating the output of the example thread aggregator of FIG. 1 operating on the example vectors illustrated in FIG. 5.

DETAILED DESCRIPTION

Figure 1:
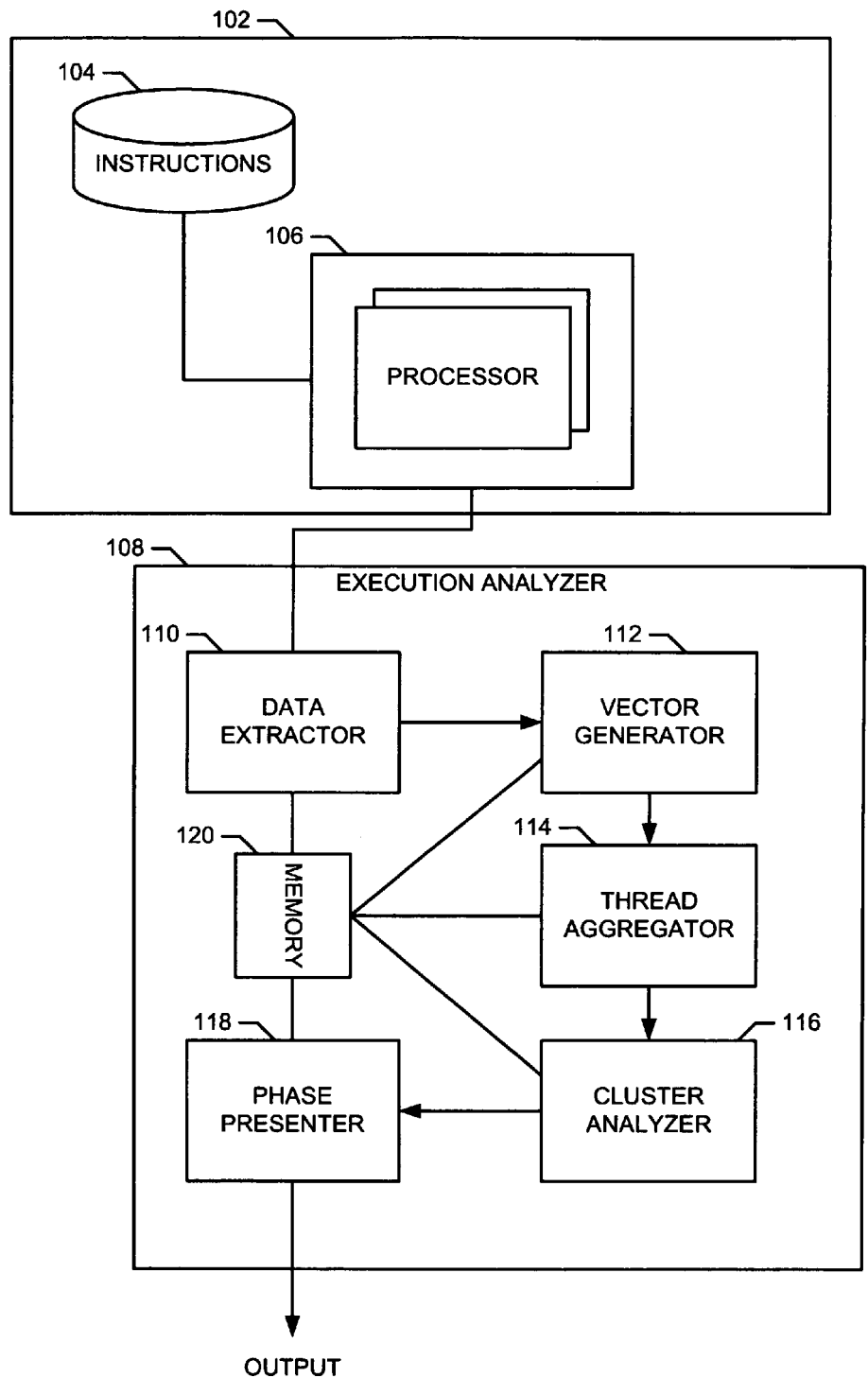
FIG. 1 is a block diagram of an example system to analyze a processor system executing a multi-threaded workload.

An example apparatus 108 to analyze a processor system 102 executing a multi-threaded workload is illustrated in FIG. 1. The disclosed example apparatus 108 is capable of analyzing the execution of the multi-threaded workload executing on the processor system 102 and determining time-dependent phases associated with the execution of the multi-threaded workload. In particular, the example apparatus 108 periodically records an identifier of the next instruction that is about to be executed for each thread of the multi-threaded workload. Vectors representative of the frequency of execution for the instructions are then generated. The vectors are then concatenated into an array. The array is analyzed to locate patterns that are indicative of time-dependent phases. The located phases are then associated with the execution of each of the threads of the multi-threaded workload.

The example processor system 102 of FIG. 1 includes a source of code 104 and one or more processors 106. The source of code 104 stores machine readable instructions that are executed by the one or more processors 106. The example source of code 104 stores instructions in binary format. However, persons of ordinary skill in the art will recognize that the instructions may be stored in any machine readable format including, for example, American Standard Code for Information Interchange (ASCII) text, Unicode text, extended binary-coded decimal interchange code (EBCDIC), native machine code, and bytecode. The example source of code 104 may be implemented by any type of memory or storage device including, for example, volatile memory and non-volatile memory. Example hardware that may be used to implement the source of code 104 is described in further detail below in conjunction with FIG. 11.

The one or more processors 106 execute the machine readable instructions stored in the source of code 104. The one or more processors 106 of the illustrated example are capable of simultaneously executing two or more threads each of which executes at least a portion of the instructions. The threads may execute overlapping or non-overlapping portions of the instructions. The processors 106 of the illustrated example are implemented by one or more Intel® Itanium® II processors that include registers for storing information about program execution. However, persons of ordinary skill in the art will recognize that any brand and/or model of processor may be alternatively or additionally used to execute the instructions stored in the source of code 104 such as, for example, any processor from Intel Corporation (e.g., Xeon® processors, Pentium® 4 processors, Pentium® 3 processors, etc.), any processor from Advanced Micro Devices™ (AMD™), any processor from International Business Machines (IBM®), and/or any processor from any other entity.

The execution analyzer 108 of the illustrated example analyzes the execution of the instructions on the one or more processors 106 to identify time-dependent phases associated with the execution of the instructions stored in the source of code 104. The example execution analyzer 108 includes a data extractor 110, a vector generator 112, a thread aggregator 114, a cluster analyzer 116, a phase presenter 118, and a memory 120.

The data extractor 110 monitors the one or more processors 106 to obtain information associated with the execution of the instructions stored in the source of code 104 and stores the collected information in the memory 120. The data extractor 110 of the illustrated example is implemented by the Intel VTune™ performance analyzer. The VTune™ performance analyzer is a tool that monitors the execution of software instructions on processors. In particular, the VTune™ performance analyzer periodically interrupts (e.g., temporarily stops) the execution of a monitored processor(s) to sample information stored in one or more registers associated with the monitored processor(s). While the VTune™ performance analyzer is one example manner of implementing the data extractor 110, any software, firmware, and/or hardware for monitoring the execution of a processor may be used in this role. In addition, while the data extractor 110 is shown as a component of the example execution analyzer 108, persons of ordinary skill in the art will recognize that the data extractor 110 may alternatively be software, firmware, and/or hardware that is separate from the execution analyzer 108.

The example data extractor 110 of FIG. 1 periodically stops execution of the instructions by the one or more processors 106 and records the identifier of the next instruction to be executed for each executing thread. For example, the data extractor 110 may stop execution after every 100,000 instructions have been executed. Alternatively or additionally, the data extractor 110 may stop execution after a number of specific instructions (e.g., a number of branch, jump, and/or load instructions).

Once the processors are stopped, the example data extractor 110 of FIG. 1 records the extended instruction pointer (EIP) associated with the next instruction to be executed for each thread. For example, a set of instructions may be executed multiple times using different numbers of threads. FIG. 4 is a table illustrating an example output from the data extractor 110. Although the illustrated data extractor 110 functions as described above, persons of ordinary skill in the art will recognize that any algorithm for extracting information may be alternatively used such as, for example, retrieving an instruction pointer without stopping execution of the program. In addition, while the example data extractor 110 extracts EIPs, any other identifier associated with execution may be used. The information associated with execution may be stored in the memory 120, may be output to the vector generator 112, may be output to a display, etc. For example, the VTune™ performance analyzer saves the samples to a TB5 data file stored to a memory. The data file may be converted to a plaintext file using a post-processing utility called sfdump5 that is included with the VTune™ performance analyzer version 7.1. The plaintext file includes rows corresponding to records and columns corresponding to fields.

The vector generator 112 of the illustrated example receives the output of the data extractor 110 (e.g., directly from the data extractor 110 or by accessing one or more data structures, such as the example data structure of FIG. 4, in memory 120) and divides the data associated with each thread into intervals. The size of the interval is dependent on the total number of instructions executed and the sampling rate of the data extractor 110. An example division of the data extractor output is illustrated by the darkened lines in the table of FIG. 4. For example, the intervals may be 1,000 times the sampling rate (e.g., 100 million instructions per interval when the program execution is sampled every 100,000 instructions).

The vector generator 112 of the illustrated example then generates a vector for each interval. Each vector reflects the frequency at which each EIP is recorded during the corresponding interval. For example, each vector may be a one-dimensional array where each element identifies a number of times that a corresponding EIP was recorded during the associated interval. The example array contains one element for each possible EIP. An example set of vectors for the example output illustrated in FIG. 4 are illustrated in FIG. 5. In the simplified example of FIGS. 4-5, only 3 EIPs (e.g., 1, 2, and 3) may occur. An example manner of implementing the vector generator 112 is described below in conjunction with the description of FIG. 3. The vector generator 112 outputs the vectors to the thread aggregator 114 or the memory 120.

The thread aggregator 114 of the illustrated example receives each of the vectors associated with each of the intervals for each of the threads (e.g., the vectors illustrated in FIG. 5) from the vector generator 112 and/or the memory 120. The example thread aggregator 114 concatenates each of the vectors into an array of vectors. The thread aggregator 114 may concatenate vectors from multiple threads that have been executed multiple times. For example, if a set of instructions are executed multiple times using different numbers of threads, the vectors generated for the multiple runs may be concatenated. The thread aggregator 114 of the illustrated example tracks information about which thread and at what execution period (e.g., time or the number of instructions executed) the vector is associated. Accordingly, the vector may later be retrieved from the array and associated with the thread. An example table illustrating the output of the thread aggregator 114 operating on the vectors illustrated in FIG. 5 is illustrated in FIG. 6. The thread aggregator outputs the array and the identifying information to the cluster analyzer 116 and/or the memory 120.

Figure 7:
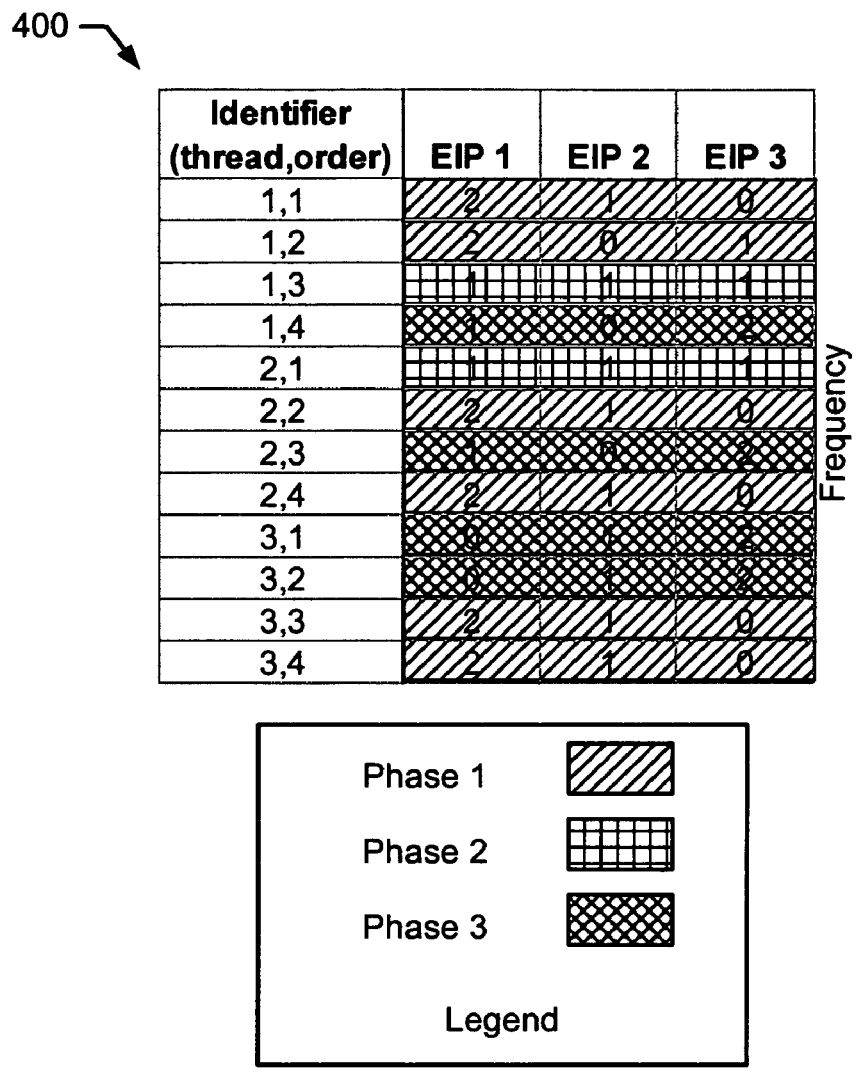
FIG. 7 is the example table of FIG. 6 including shading that identifies the phases output by the example cluster analyzer of FIG. 1.

The cluster analyzer 116 of the illustrated example receives the array of vectors (e.g., the array illustrated in FIG. 6) from the thread aggregator 114 and/or the memory 120, and analyzes the array to locate patterns (groups) that are associated with execution phases. The example cluster analyzer 116 uses the k-means clustering algorithm to identify patterns in the array. However, any algorithm for identifying patterns in the array may be used such as, for example, the spectral clustering algorithm or the agglomerative algorithm. The number of clusters used is dependent on the instructions that are analyzed. For example, the cluster analyzer 116 may use 5 clusters, between 5 and 10 clusters, or any other number of clusters. The number of clusters may be selected manually using trial and error or may be selected using an optimization algorithm such as, for example, the Bayesian information criterion (BIC) algorithm. The cluster analyzer 116 identifies the phase (i.e., the cluster) associated with each of the vectors in the array. The cluster analyzer 116 outputs the cluster information to the memory 120 and/or the phase presenter 118. FIG. 7 is the example table 400 of FIG. 6 including shading that identifies the phases output by the example cluster analyzer 116.

Figure 8:
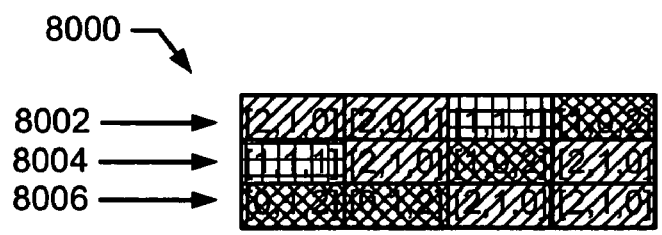
FIG. 8 is the example set of vectors of FIG. 5 including a representation of phases output by the example cluster analyzer of FIG. 1.
Figure 9:
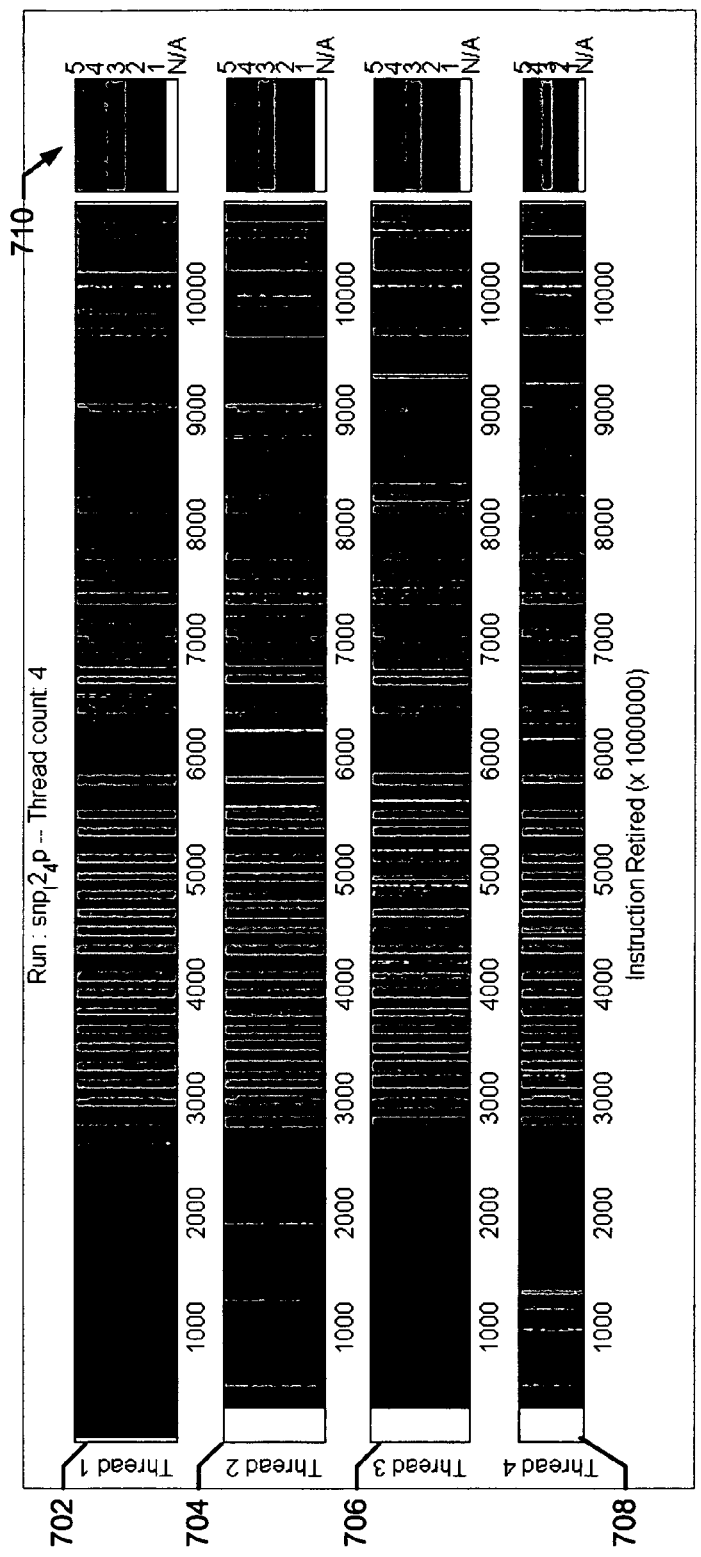
FIG. 9 is an example band-chart output or presented by the example phase presenter of FIG. 1.

The phase presenter 118 of the illustrated example receives the phase-identified vectors in the array from the cluster analyzer 116 and/or the memory 120 and divides the vectors of the array into the threads associated with each vector. The phase presenter 118 then places the vectors in their execution order. The phase presenter 118 may use data received with the array and/or may retrieve data from the memory 120 to determine the appropriate thread and order for each of the vectors. The phase presenter 118 of the illustrated example then uses the vectors sorted by thread and execution order to generate a display of the execution phases associated with the instructions stored in the source of code 104. For example, the phase presenter 118 may generate a band-chart for each thread such as the example band-chart of FIG. 9. In the example of FIG. 9, each band of the band-chart corresponds to an interval of execution (e.g., 100 million instructions). Each phase is associated with a unique color. Then, each band in the example band-chart is colored with the color associated with the phase of the interval associated with the band. FIG. 8 is an example set of vectors 8000 generated by the phase presenter 118 from the example table 400 of FIG. 6 including shading that identifies phases associated with each vector.

The output of the phase presenter 118 may be used to accurately select subsets of an instruction set to be used for simulation. For example, when simulating a set of instructions on computer hardware, it is desirable to simulate a subset of the instructions to allow the simulation to be completed faster. Selecting one or more sets of instructions from each of the program phases will result in a more accurate estimation of hardware performance for a give instruction set. Additionally, the number of instructions selected from each phase may be chosen based on the relative duration of execution for each phase. In other words, if a given instruction set executes 4 million instructions while in phase 1 and 2 million instructions in phase 2, the subset of instructions chosen from phase 1 may be twice the length of the subset of instructions chosen from phase 2.

The memory 120 of the illustrated example is capable of receiving data from, storing data from, and/or sending data to one or more of the data extractor 110, the vector generator 112, the thread aggregator 114, the cluster analyzer 116, and/or the phase presenter 118. The example memory 120 may be implemented by any type of memory or storage device including, for example, volatile memory and non-volatile memory. Example hardware that may be used to implement the memory 120 is described in further detail below in conjunction with FIG. 11.

Figure 2:
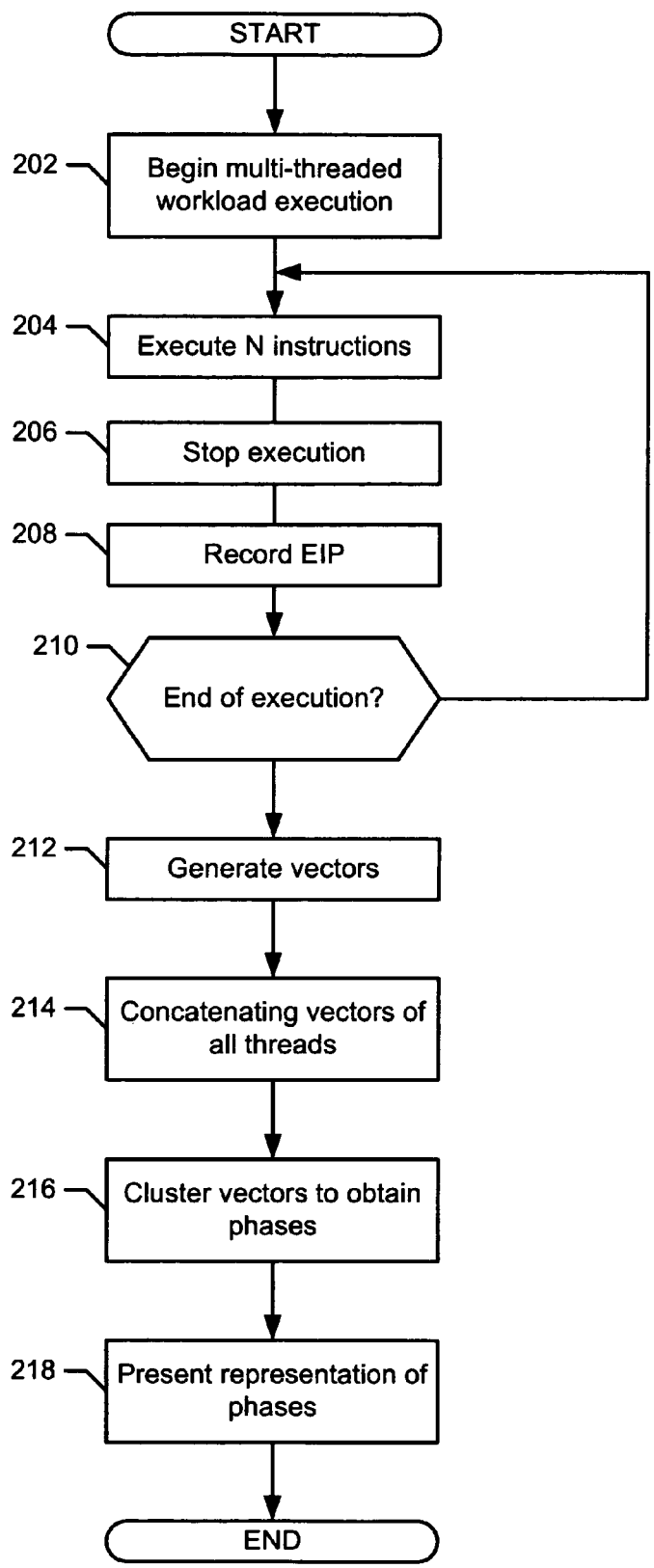
FIG. 2 is a flow diagram representative of example machine readable instructions that may be executed to implement the execution analyzer of FIG. 1.

A flowchart representative of example machine readable instructions for implementing the apparatus 108 of FIG. 1 is shown in FIG. 2. In this example, the machine readable instructions comprise a program for execution by a processor such as the processor 9012 shown in the example computer 9000 discussed below in connection with FIG. 11. The program may be embodied in software stored on a tangible medium such as a CD-ROM, a floppy disk, a hard drive, a digital versatile disk (DVD), or a memory associated with the processor 9012, but persons of ordinary skill in the art will readily appreciate that the entire program and/or parts thereof could, alternatively be executed by a device other than the processor 9012 and/or embodied in firmware or dedicated hardware in a well known manner. For example, any or all of the data extractor 110, the vector generator 112, the thread aggregator 114, the cluster analyzer 116, and/or the phase presenter 118 could be implemented by software, hardware, and/or firmware. Further, although the example program is described with reference to the flowchart illustrated in FIG. 2, persons of ordinary skill in the art will readily appreciate that many other methods of implementing the example apparatus 108 may alternatively be used. For example, the order of execution of the blocks may be changed, and/or some of the blocks described may be changed, eliminated, or combined.

FIG. 2 is a flow diagram of example machine readable instructions that may be executed to implement the execution analyzer 108 of FIG. 1. As the execution analyzer 108 is initialized, the one or more processors 106 begin executing the instructions stored in the source of code 104 (block 202). The one or more processors 106 then execute N instructions (or however many instructions remain), where N is dependent upon a predefined sampling rate (block 204). For example, N may be 100,000 instructions. After execution of N instructions (block 204), the data extractor 110 stops the execution of the one or more processors 106 (block 206). The data extractor 110 then records the EIP of the next instruction to be executed for each thread that is executing (block 208). Alternatively, the data extractor 110 may record any other identifier associated with any other characteristic of execution such as, for example, an identifier of the last instruction(s) executed. The data extractor 110 may additionally or alternatively retrieve other information associated with the execution such as, for example, the program counter (PC), an instruction count, a clock state, etc. The data extractor 110 then determines if all instructions have been executed (block 210). If all instructions have not been executed (block 210), control proceeds to block 204 to retrieve another sample.

Blocks 204 to 210 may be executed for a single execution of a set of instructions or may be executed for multiple executions of a set of instructions. For example, a set of instructions may be executed multiple times with different numbers of threads and/or with threads spawned at different times. Additionally or alternatively, multiple instruction sets may be executed. Data from the multiple executions is gathered and analyzed in blocks described below. If multiple executions are to be performed, block 210 of the illustrated example does not shift control to block 212 until all of the executions have been sampled. In addition, if the processor system 102 includes multiple processors, blocks 204-210 may be performed simultaneously and independently for each processor. For example, each processor may execute instructions at a different rate and thus, each processor will be interrupted for sampling at different times. The identification of the processor from which an EIP is sampled may be recorded.

If all instructions have been executed, the vector generator 112 generates vectors for each interval of the recorded EIP values associated with each thread of execution (block 212).

An example process for generating vectors will be described in conjunction with FIG. 3. After the vectors have been generated, the thread aggregator 114 of the illustrated example combines each of the vectors into an array of vectors (block 214). Information about the order of execution and the thread corresponding to each vector may be stored with the array or may be stored separately. (Block 214 is omitted if each thread is to be clustered and analyzed individually.) The cluster analyzer 116 then analyzes the vectors for patterns to locate the phases of the program execution (block 216). Then, the phase analyzer 118 generates an output indicating the phase corresponding to each interval of each thread (block 218). For example, the phase analyzer 118 may generate a band-chart for each thread where each band corresponds to an interval and each band is colored with a color corresponding to the phase associated with the interval. An example band-chart is illustrated in FIG. 9.

Figure 3:
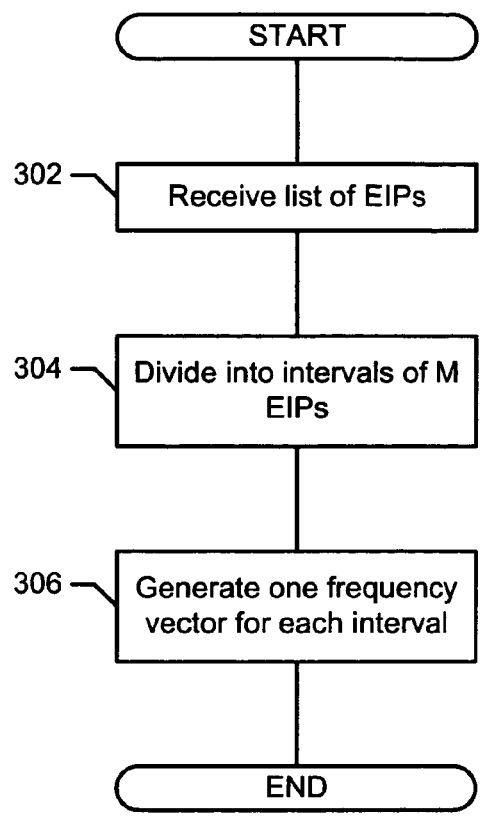
FIG. 3 is a flow diagram representative of example machine readable instructions that may be executed to generate vectors in response to a call from the example instructions of FIG. 2.

FIG. 3 is a flow diagram of example machine readable instructions that may be executed to implement block 212 of FIG. 2 for generating vectors. The vector generator 112 of FIG. 1 receives a list of EIPs for each thread of execution from the data extractor 110 (block 302). The vector generator 112 divides each thread's list into intervals of M instructions, where M is a predefined number of instructions (block 304). For example, M may be 1,000 times the sampling rate used by the data extractor 110 to obtain the EIPs for each thread. In this example, each interval consists of 1,000 EIPs. Then, a vector is generated for each interval of each thread (block 306). In the illustrated example, each vector is a one-dimensional array of frequencies at which each EIP occurs in the interval corresponding to the vector. Thus, each element in the array corresponds to the number of times that an EIP is executed. For example, the first element of an array may correspond to the number of times that a first EIP was sampled by the data extractor 110 during the execution of the interval associated with the vector.

FIG. 4 is an example table 400 output by the example data extractor 110 of FIG. 1. The example table 400 includes a first column 401 that indicates the number of instructions that have been retired (executed) before the EIPs in each row were sampled. For example, the first row was sampled after 100,000 instructions were retired. The example table 400 also includes a column for each executing thread (e.g., a second column 402 for thread 1, a third column 404 for thread 2, a fourth column 406 for thread 3). The values of each of the second through fourth columns 402-406 includes the identifier (e.g., 1, 2, or 3) of the EIP that was to execute next when a processor executing the corresponding thread was sampled. For example, row 1 indicates that after 100,000 instructions were retired, thread 1 was to next execute the instruction located at EIP 1, thread 2 was to next execute the instruction located at EIP 2, and thread 3 was to next execute the instruction located at EIP 2.

The example table 400 of FIG. 4 has been divided into a set of intervals (e.g., a first interval 408, a second interval 410, a third interval 412, and a fourth interval 414) by the vector generator 112 of FIG. 1. In the example table 400, each interval is representative of the execution of 300,000 instructions (e.g., 3 EIP samples that have been retrieved at intervals of 100,000 instructions). Persons of ordinary skill will recognize that the relative size of the intervals, the number of unique EIPs, and the number of thread are merely examples included for purposes of illustration, and that any size of intervals, any number of unique EIPs, and any number of threads may be used.

FIG. 5 is an example set of vectors 500 generated from the example output illustrated in FIG. 4 by the example vector generator 112 of FIG. 1. A first set of vectors 502 is associated with the data in the second column 402 for thread 1 of FIG. 4. A second set of vectors 504 is associated with the data in the third column 404 for thread 2 of FIG. 4. A third set of vectors 506 is associated with the data in the fourth column 406 for thread 3 of FIG. 4. For example, the first set of vectors 502 includes a first vector [2,1,0] that is associated with the first interval 408 of the second column 402 for thread 1. Each element of the vector illustrates the number of times that each EIP was extracted during the interval. For example, the first vector [2,1,0] of the first set of vectors 502 indicates that EIP 1 was extracted two time, EIP 2 was extracted one time, and EIP 3 was extracted zero times. Persons of ordinary skill in the art will recognize that the length of each vector will depend on the number of possible EIPs for a specific instruction set. For example, the instruction set sampled to generate the table 400 of FIG. 4 includes three unique EIPs. Accordingly, each vector associated with the instruction set sampled to generate the table 400 of FIG. 4 has a length of three. In particular, the number of possible EIPs, and, thus, the length of the vectors will most likely be in the hundreds or thousands.

FIG. 6 is an example table 600 illustrating the output of the example thread aggregator 114 of FIG. 1 after operating on the example set of vectors 500 illustrated in FIG. 5. The first column of the example table 600 includes an identifier to indicate the thread and order that is associated with the vector of each row. For example, the first row is from thread 1 and is the first vector associated with that thread (i.e., the vector from the first interval). The example table 600 includes a second, third, and fourth column which include the elements of the vector identified by the first column. For example, the first row of FIG. 5 corresponds to the first vector of the first set of vectors 502 of FIG. 5. In other words, each of columns two to four respectively indicates the number of times that EIPs 1 to 3 was extracted in the corresponding interval. The example table 600 may include vectors from a single thread, multiple threads, a single execution for one or more threads, and/or multiple executions for one or more threads. The example table 600 is analyzed by the example cluster analyzer 116 to identify phases of execution for the instruction set(s) that were monitored to generate the data in the example table 600.

FIG. 7 is the example table 400 of FIG. 6 including shading that identifies the phases output by the example cluster analyzer 116 of FIG. 1. In particular, each row of the example table 400 is assigned a phase. For example, the first row has been assigned phase 1. The example table 400 may be output by the cluster analyzer 116 after analyzing the example table 400 of FIG. 6.

FIG. 8 is an example set of vectors 8000 including a representation of phases output by the example cluster analyzer 116 of FIG. 1. The example set of vectors 8000 includes a first set of vectors 8002, a second set of vectors 8004, and a third set of vectors 8006. The example set of vectors 8000 may be generated by the phase presenter 118 using the example table 400 illustrated in FIG. 7. In particular, the identifier column of the example table 400 is used to determine the relative location of each vector. For example, the first row of table 400 indicates that it is the first vector of the first thread. Accordingly, the first row of table 400 is presented as the first vector of the first set 8002. The example set of vectors 8000 presented with shading indicating assigned phases provides a visual description of the phase-based execution of a program. The example set of vectors 8000 presented with shading is similar to the band-chart illustrated in FIG. 9.

FIG. 9 is an example band-chart output or presented by the example phase presenter 118 of FIG. 1. The example band-chart indicates the phases executed during each of the intervals of a four-threaded execution (e.g., first thread 702, second thread 704, third thread 706, and fourth thread 708). The representation for each thread includes a legend 710 indicating the phase to which each phase corresponds. Persons of ordinary skill will recognize that the band-chart of FIG. 9 is an example, and any other method of presenting phase data to a user may be used. For example, the phase presenter 118 may output a set of data points with phase indicators that may be interpreted by a user or another program.

Figure 10:
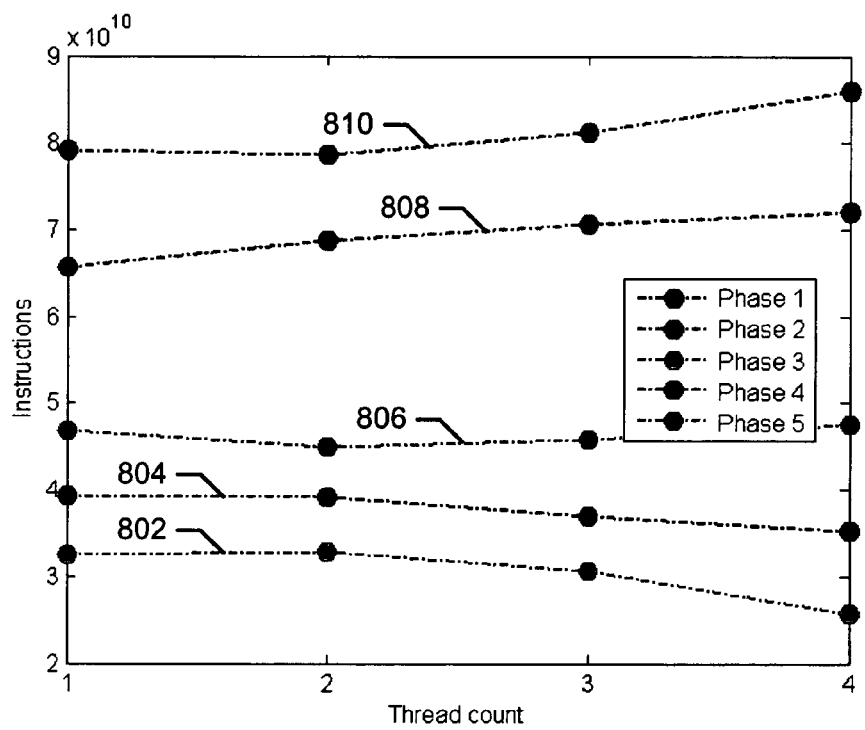
FIG. 10 is an example line-chart output by the example phase presenter of FIG. 1 to display phase information for instructions that are analyzed for different numbers of threads.

FIG. 10 is an example line-chart that may be output to display phase information for instructions that are analyzed multiple times using different numbers of threads. For example, FIG. 10 includes data points for executions using one, two, three, and four threads. The line-chart includes a line for phase 1 (804), a line for phase 2 (810), a line for phase 3 (802), a line for phase 4 (808), and a line for phase 5 (806). Each point indicates the number of instructions that were executed during each phase. For example, the line for phase 2 (810) indicates that for an execution using one thread, approximately $8 \times 10^{10}$ instructions were executed during phase 2. The line-chart may be used to determine, for example, how many instructions are executed during each phase and how the number of threads affects execution. For example, the line-chart of FIG. 10 indicates that more instructions were executed during phase 2 (810) than any other phase. Accordingly, modifying an instruction set or hardware that decreases the execution time for one or more instructions assigned to phase 2 will result in a greater impact than performing the same modification for instructions assigned to other threads.

Figure 11:
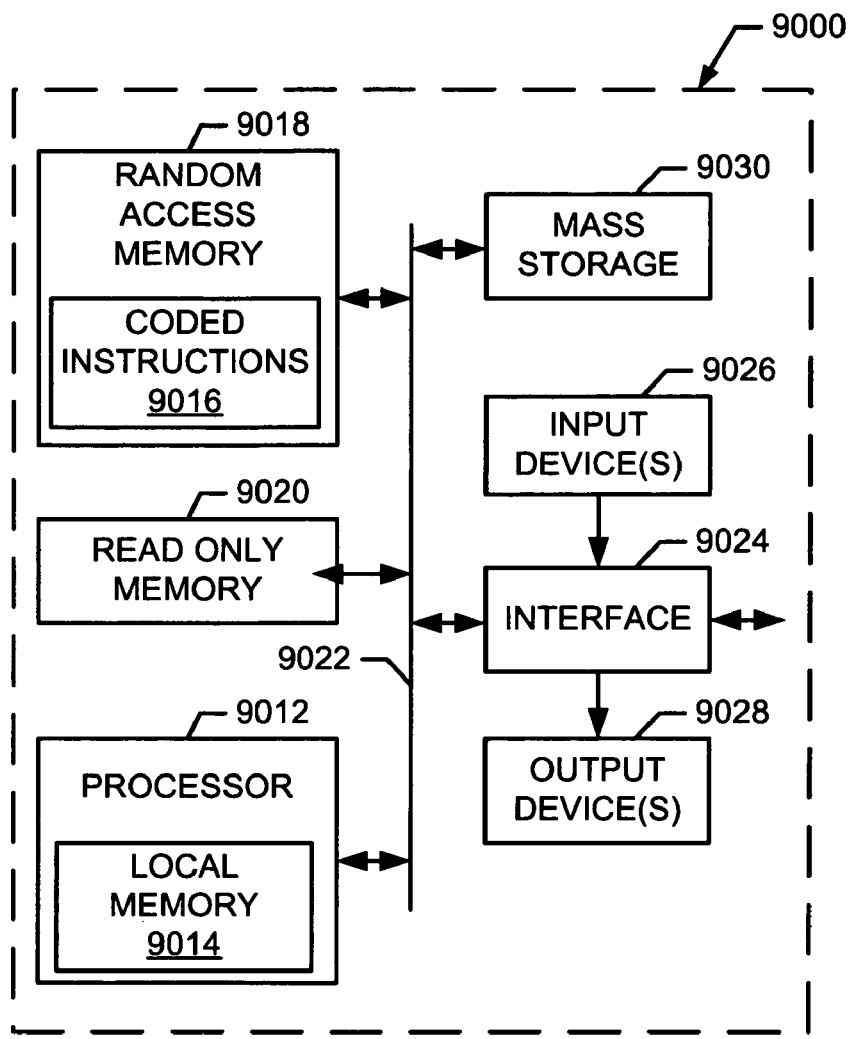
FIG. 11 is an example processor system that may be used to execute the example machine readable instructions of FIGS. 2 to 3 to implement the example system of FIG. 1.

FIG. 11 is a block diagram of an example computer 9000 capable of executing the machine readable instructions illustrated in FIGS. 2 and 3 to implement the apparatus and/or methods disclosed herein. The computer 9000 can be, for example, a server, a personal computer, a personal digital assistant (PDA), an Internet appliance, a set top box, or any other type of computing device.

The system 9000 of the instant example includes a processor 9012 such as a general purpose programmable processor. The processor 9012 includes a local memory 9014, and executes coded instructions 9016 present in the local memory 9014 and/or in another memory device. The processor 9012 may execute, among other things, the machine readable instructions illustrated in FIGS. 2 and 3. The processor 9012 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 9012 is in communication with a main memory including a volatile memory 9018 and a non-volatile memory 9020 via a bus 9022. The volatile memory 9018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 9020 may be implemented by flash memory and/or any other desired type of memory device. Access to the main memory 9018, 9020 is typically controlled by a memory controller (not shown) in a conventional manner.

The computer 9000 also includes a conventional interface circuit 9024. The interface circuit 9024 may be implemented by any type of well known interface standard, such as an Ethernet interface, a universal serial bus (USB), and/or a third generation input/output (3GIO) interface.

One or more input devices 9026 are connected to the interface circuit 9024. The input device(s) 9026 permit a user to enter data and commands into the processor 9012. The input device(s) can be implemented by, for example, a keyboard, a mouse, a touchscreen, a track-pad, a trackball, isopoint and/or a voice recognition system.

One or more output devices 9028 are also connected to the interface circuit 9024. The output devices 9028 can be implemented, for example, by display devices (e.g., a liquid crystal display, a cathode ray tube display (CRT), a printer and/or speakers). The interface circuit 9024, thus, typically includes a graphics driver card.

The interface circuit 9024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 9000 also includes one or more mass storage devices 9030 for storing software and data. Examples of such mass storage devices 9030 include floppy disk drives, hard drive disks, compact disk drives and digital versatile disk (DVD) drives.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to analyze execution of a multi-threaded program on a processor system, the method comprising:

generating a first program trace associated with an execution of a first thread;

generating a first list of execution frequencies associated with the first program trace;

generating a second program trace associated with an execution of a second thread;

generating a second list of execution frequencies associated with the second program trace;

generating a first set of one or more vectors for the first list of execution frequencies, wherein at least one of the vectors in the first set of the one or more vectors for the first list of execution frequencies has a first element indicating a number of times that a first execution instruction pointer was recorded in the first program trace and a second element indicating a number of times that a second execution instruction pointer was recorded in the first program trace;
generating a second set of one or more vectors for the second list of execution frequencies; and
analyzing the one or more vectors to identify one or more program phases, wherein at least one of generating the first program trace, generating the first list of execution frequencies, generating the second program trace, generating the second list of execution frequencies, generating the first set of one or more vectors, generating the second set of one or more vectors, and analyzing the one or more vectors to identify one or more program phases uses a processor.

2. A method as defined in claim 1, further comprising:
determining a first subset of instructions of the multi-threaded program associated with a first phase;
determining a second subset of the instructions of the multi-threaded program associated with a second phase;
extracting a third subset of the instructions from the first subset of instructions;
extracting a fourth subset of the instructions from the second subset of instructions;
simulating an execution of the instructions using the third and fourth subsets of the instructions.

3. A method as defined in claim 1, wherein analyzing the one or more vectors to identify one or more program phases further comprises concatenating the first and second set of vectors.

4. A method as defined in claim 1, wherein analyzing the one or more vectors further comprises performing at least one of k-means clustering, spectral clustering, and agglomerative clustering to identify the one or more program phases.

5. A method as defined in claim 1, wherein generating the first and second program traces is performed using a performance analyzer.

6. A method as defined in claim 1, wherein generating the first and second program traces is performed using a hardware analyzer.

7. A method as defined in claim 1, further comprising generating a first band chart representing the program phases associated with the first thread and a second band chart representing the program phases associated with the second thread.

8. A method as defined in claim 7, wherein each phase is identified in the first band chart with a different color.

9. A method as defined in claim 1, wherein the first and second program traces comprise lists of instruction pointers.

10. A method as defined in claim 9, wherein the instruction pointers are extended instruction pointers.

11. An article of manufacture storing machine readable instructions which, when executed, cause a machine to:
generate a first program trace associated with an execution of a first thread;
generate a first list of execution frequencies associated with the first program trace;
generate a second program trace associated with an execution of a second thread;
generate a second list of execution frequencies associated with the second program trace;
generate a first set of one or more vectors for the first list of execution frequencies, wherein at least one of the vectors in the first set of the one or more vectors for the first list of execution frequencies has a first element indicating a number of times that a first execution instruction pointer was recorded in the first program trace and a second element indicating a number of times that a second execution instruction pointer was recorded in the first program trace;
generate a second set of one or more vectors for the second list of execution frequencies; and
analyze the one or more vectors to identify one or more program phases.

12. An article of manufacture as defined in claim 11, wherein the machine readable instructions further cause the machine to:
determine a first subset of instructions associated with a first phase;
determine a second subset of the instructions associated with a second phase;
extract a third subset of the instructions from the first subset of instructions;
extract a fourth subset of the instructions from the second subset of instructions;
simulate an execution of the instructions using the third and fourth subsets of instructions.

13. An article of manufacture as defined in claim 11, wherein the machine readable instructions cause the machine to concatenate the first and second set of vectors to analyze the one or more vectors.

14. An article of manufacture as defined in claim 11, wherein the machine readable instructions cause the machine to perform at least one of k-means clustering, spectral clustering, and agglomerative clustering to identify the one or more program phases.

15. An article of manufacture as defined in claim 11, wherein the machine readable instructions further cause the machine to generate a first band chart representing the program phases associated with the first thread and a second band chart representing the program phases associated with the second thread.

16. An article of manufacture as defined in claim 15, wherein each phase is identified in the first band chart with a different color.

17. An article of manufacture as defined in claim 11, wherein the first and second program traces comprise lists of instruction pointers.

18. An article of manufacture as defined in claim 17, wherein the instruction pointers are extended instruction pointers.

19. A tangible apparatus to analyze execution of a multi-threaded program on a processor system, the apparatus comprising: a processor;
a data extractor to generate a first program trace associated with an execution of a first thread and a second program trace associated with an execution of a second thread;
a vector generator to generate a first list of execution frequencies associated with the first program trace and a second list of execution frequencies associated with the second program trace and to generate a first set of one or more vectors for the first list of execution frequencies and a second set of one or more vectors for the second list of execution frequencies, wherein at least one of the vectors in the first set of the one or more vectors for the first list of execution frequencies has a first element indicating a number of times that a first execution instruction pointer was recorded in the first program trace and a second element indicating a number of times that a second execution instruction pointer was recorded in the first program trace; and
a cluster analyzer to analyze the one or more vectors to identify one or more program phases.

20. A tangible apparatus as defined in claim 19, further comprising a phase presenter to determine a first subset of instructions of the multi-threaded program associated with a first phase and a second subset of the instructions of the multi-threaded program associated with second phase, extract a third subset of the instructions from the first subset of the instructions and a fourth subset of the instructions from the second subset of the instructions, and to simulate an execution of the instructions using the third and fourth subsets of the instructions.

21. A tangible apparatus as defined in claim 19, further comprising a thread aggregator to concatenate the first and second set of vectors.

22. A tangible apparatus as defined in claim 19, wherein the cluster analyzer performs at least one of k-means clustering, spectral clustering, and agglomerative clustering to identify the one or more program phases to analyze the one or more vectors.

23. A tangible apparatus as defined in claim 19, further comprising a phase presenter to generate a first band chart representing the program phases associated with the first thread and a second band chart representing the program phases associated with the second thread.

24. A tangible apparatus as defined in claim 23, wherein each phase is identified in the first band chart with a different color.

25. A tangible apparatus as defined in claim 19, wherein the first and second program traces comprise lists of instruction pointers.

26. A tangible apparatus as defined in claim 25, wherein the instruction pointers are extended instruction pointers.

27. A method of identifying program phases in a program with at least a first thread and a second thread, the method comprising:
    generating a program trace representative of a first set of events associated with the first thread and representative of a second set of events associated with the second thread;
    generating a first set of vectors representative of frequencies of occurrence of events in the first set of events, the first set of vectors being associated with the first thread, wherein at least one of the vectors in the first set of vectors has a first element indicating a number of times that a first execution instruction pointer was recorded in the program trace and a second element indicating a number of times that a second execution instruction pointer was recorded in the program trace;
    generating a second set of vectors representative of frequencies of occurrence of events in the second set of events, the second set of vectors being associated with the second thread; and
    analyzing the first and second sets of vectors to identify program phases, wherein at least one of generating the program trace, generating the first set of vectors, generating the second set of vectors, and analyzing uses a processor.

28. A method as defined in claim 27, further comprising concatenating the first set of vectors and the second set of vectors.

29. A method as defined in claim 27, wherein the program trace comprises extended instruction pointers.

30. A method as defined in claim 27, further comprising dividing the program trace into intervals.

* * * * *

UNITED STATES PATENT AND TRADEMARK OFFICE
CERTIFICATE OF CORRECTION

PATENT NO. : 7,739,662 B2
APPLICATION NO. : 11/323532
DATED : June 15, 2010
INVENTOR(S) : Bouguet et al.

Page 1 of 1

It is certified that error appears in the above-identified patent and that said Letters Patent is hereby corrected as shown below:

Column 13, line 5 (claim 20), after "with" insert --a--.

Signed and Sealed this
First Day of February, 2011

David J. Kappos
*Director of the United States Patent and Trademark Office*